(12) United States Patent (10) Patent No.: US 8,363,840 B2
Seleznev et al. (45) Date of Patent: Jan. 29, 2013

(54) METHOD AND APPARATUS FOR PROVIDING BROADCAST SERVICE USING ENCRYPTION KEY IN A COMMUNICATION SYSTEM

(75) Inventors: Sergey Nikolayevich Seleznev, Suwon-si (KR); Byung-Rae Lee, Seoul (KR); Sung-Oh Hwang, Yongin-si (KR); Kook-Heui Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 901 days.

(21) Appl. No.: 12/418,141

(22) Filed: Apr. 3, 2009

(65) Prior Publication Data

US 2009/0252324 A1 Oct. 8, 2009

(30) Foreign Application Priority Data

Apr. 4, 2008 (KR) .................. 10-2008-0031885

(51) Int. Cl.
*H04L 9/00* (2006.01)
(52) U.S. Cl. ........ 380/277; 380/201; 380/210; 380/239; 713/151; 713/160; 713/187; 726/22; 726/26
(58) Field of Classification Search .................. None
See application file for complete search history.

(56) References Cited

U.S. PATENT DOCUMENTS

| 2005/0157876 | A1* | 7/2005 | Jeong et al. .................. 380/200 |
| 2006/0064584 | A1* | 3/2006 | Wei .............................. 713/165 |
| 2006/0129805 | A1 | 6/2006 | Kim et al. |
| 2007/0140481 | A1* | 6/2007 | Parameswaran Rajamma ........................ 380/37 |
| 2008/0069357 | A1 | 3/2008 | Kim et al. |

FOREIGN PATENT DOCUMENTS

| CN | 101150579 A | 3/2008 |
| EP | 1 223 705 A2 | 7/2002 |
| JP | 7-72793 A | 3/1995 |
| JP | 2001-320357 A | 11/2001 |
| WO | 02/082242 A1 | 10/2002 |
| WO | 2004/102966 A1 | 11/2004 |
| WO | 2006/129983 A1 | 12/2006 |
| WO | 2007/097604 A1 | 8/2007 |

* cited by examiner

*Primary Examiner* — Shewaye Gelagay
(74) *Attorney, Agent, or Firm* — Jefferson IP Law LLP

(57) ABSTRACT

A method and apparatus for providing a broadcast service in a communication system is provided. The method includes creating a seed key pair including a first key and a second key, transmitting the seed key pair to a terminal to which the broadcast service is to be provided, creating a certain number of encryption keys using the seed key pair, the certain number corresponding to a lifetime of the seed key pair, encrypting broadcast service data for the lifetime using the encryption keys, and broadcasting the encrypted broadcast service data.

20 Claims, 13 Drawing Sheets

METHOD AND APPARATUS FOR PROVIDING BROADCAST SERVICE USING ENCRYPTION KEY IN A COMMUNICATION SYSTEM

PRIORITY

This application claims the benefit under 35 U.S.C. §119 (a) of a Korean patent application filed in the Korean Intellectual Property Office on Apr. 4, 2008 and assigned Ser. No. 10-2008-0031885, the entire disclosure of which is hereby incorporated by reference.

BACKGROUND OF THE INVENTION

1. Field of the Invention

The present invention relates to broadcast services in a communication system. More particularly, the present invention relates to a method and apparatus for offering broadcast services using encryption keys in a communication system.

2. Description of the Related Art

Recently, communication systems have been developed to offer a variety of multimedia services to users. Accordingly, broadcast and multicast services may be used to provide diverse contents to users. The broadcast and multicast services will be referred to herein as "broadcast services."

The term "broadcast service" refers to a point-to-multipoint service in which one source object transmits multimedia data, such as audio data, image data and/or video data, to a plurality of recipients within its service coverage based on a uni-directional bearer service. The broadcast service supports a broadcast mode and a multicast mode. In the broadcast mode, data is broadcasted to all users in the service coverage. On the other hand, in the multicast mode, users have to subscribe to a particular service or service group provided by a Service Provider (SP) in order to enjoy multicast services.

In the multicast mode, broadcast service data is encrypted before transmission so that it may be delivered only to the users who have subscribed to the broadcast service. The transmitted encrypted data must be decrypted by the users prior its use. Therefore, encryption keys, used by the service provider in encrypting broadcast data, should be shared with the users. A description will now be made of an encryption key management for broadcast service data between a service provider and users in a conventional communication system.

FIG. 1 illustrates an encryption key management in a conventional broadcast service system. The encryption key management method occurs between a network and a terminal in a broadcast service system based on Worldwide Inter-operability for Microwave Access (WiMax), i.e., Institute of Electrical and Electronics Engineers (IEEE) standard 802.16. For reference, the encryption key management described in connection with FIG. 1 can be similarly applied to a 3rd Generation Partnership Project (3GPP) broadcast system. Before a detailed description of the encryption key management is given, factors used for encryption key management will be described below.

A Traffic Encryption Key (TEK) is used to encrypt service content data. The TEK is periodically updated and transmitted to a terminal(s) having a Group Key (GK) defined below. The terminal receives the TEK and can decrypt data encrypted with a TEK using the received TEK.

The Group Key (GK) is a key shared among terminals that have subscribed to a broadcast service. The GK, commonly created in a network, can be periodically updated and transmitted to terminals that have subscribed to a particular service group.

A Security Key (SK) is mutually shared by a network and a terminal that has subscribed to a broadcast service, through a certain setting process. The SK is used by the network to encrypt and transmit a GK or the like.

A detailed description of FIG. 1 will now be made based on factors used for encryption key management.

Referring to FIG. 1, a network 120 encrypts a GK and transmits the GK to a terminal 110 in step 101. The GK is encrypted with an SK and transmitted to each terminal 110 on a point-to-point basis. The resulting key is indicated by $E_{SK}(GK_y)$, where a subscript "y" indicates an order in which the GK is updated when a broadcast service call is connected. That is, the resulting the key is y-th updated in an arbitrary call.

In step 103, the network 120 updates a TEK with the $GK_y$ and transmits the resulting key $TEK_{x+1}$ to the terminal 110 on a point-to-multipoint basis. The network 120 encrypts actual content data using the $TEK_{x+1}$ and the terminal 110 decrypts the encrypted data using the $TEK_{x+1}$. Since the TEK is set shorter than the GK in a lifetime, the TEK is more frequently updated compared with the GK. In step 105, the TEK is encrypted and updated by a $GK_y$ and the resulting key $TEK_{x+n}$ is transmitted to the terminal 110. That is, the TEK undergoes n update processes from the process for the $TEK_{x+1}$ of step 103 through the process for the $TEK_{x+n}$ of step 105. Here, the same $GK_y$ is used in steps 103 and 105. In step 107, as the lifetime of the GK 109 expires, a new GK is updated and transmitted to the terminal 110 on a point-to-point basis. As a result, the TEK is encrypted and updated with a newly updated $GK_{y+1}$.

With reference to FIGS. 2 and 3, a description will now be made of a conventional encryption key management in an Open Mobile Alliance BroadCAST (OMA BCAST) system. FIG. 2 illustrates an encryption key management for a registered terminal, and FIG. 3 illustrates an encryption key management for a Pay-Per-View (PPV) terminal. The "registered terminal" refers to a terminal that subscribes to a particular broadcast service for a relatively long time, while the "PPV terminal" refers to a terminal that subscribes to a service in units of a short time, e.g. in units of specific programs. For example, a terminal, which has purchased a one-month coupon for an arbitrary broadcast service, may correspond to the registered terminal. A terminal, which has purchased a coupon for a single drama at a particular date, corresponds to the PPV terminal. A length of the subscription period is variable.

In the OMA BCAST, a Service Encryption Key (SEK) and a Program Encryption Key (PEK) are further used in addition to the keys used in the WiMax of FIG. 1. The SEK is used to encrypt a particular broadcast service, and the PEK is used to encrypt a particular program. For example, the broadcast service can be provided by a service provider, and the program can be a particular program provided by the service provider.

Encryption key management in a registered terminal will first be described with reference to FIG. 2.

FIG. 2 illustrates an encryption key management in a registered terminal in a conventional OMA BCAST.

Referring to FIG. 2, a network 120 updates an SEK with an SK and transmits a resulting key $SEK_y$ to a registered terminal 210 in step 201. In step 203, the network 120 encrypts a $PEK_z$ with the updated $SEK_y$, updates a TEK with the encrypted $PEK_z$, and transmits the resulting key $TEK_{x+1}$ to the registered terminal 210. The network 120 encrypts content data with the updated $TEK_{x+1}$ and transmits the encrypted data. The registered terminal 210 decrypts the transmitted encrypted data using the transmitted updated $TEK_{x+1}$. When a lifetime of the $TEK_{x+1}$ expires, the network 120 updates the TEK again in step 205. Also, when a lifetime of the $SEK_y$ 209 expires, the network 120 updates a SEK with an SK and transmits the resulting key $SEK_{y+1}$ to the registered terminal 210 in step 207. The $SEK_{y+1}$ is then used for encryption of the PEK.

With reference to FIG. 3, a description will now be made of an encryption key management in a PPV terminal. FIG. 3 illustrates an encryption key management in a PPV terminal in a conventional OMA BCAST.

Referring to FIG. 3, a network 120 encrypts a $PEK_z$ with an SK at an arbitrary time and transmits the encrypted $PEK_z$ to a PPV terminal 310 in step 301, thereby updating the PEK. In step 303, the network 120 updates the TEK. That is, the network 120 encrypts the $PEK_z$ with an $SEK_y$, encrypts a $TEK_{x+1}$ with the $PEK_z$, and transmits the encrypted keys to the PPV terminal 310. Thereafter, during a lifetime of the $PEK_z$, the network 120 encrypts a TEK with the $PEK_z$ to update the TEK in sequence. After a lifetime of the $PEK_z$ expires, the network 120 updates the next PEK ($PEK_{z+1}$) in step 305. That is, the network 120 encrypts the $PEK_{z+1}$ with an SK and transmits the encrypted $PEK_{z+1}$ to the PPV terminal 310. Accordingly, a TEK is encrypted with the $PEK_{z+1}$ to update the TEK until a lifetime of the $PEK_{z+1}$ 309 expires. In step 307, an $n^{th}$ TEK ($TEK_{x+n}$) is updated with a $PEK_{z+m}$.

As described with reference to FIGS. 1 to 3, since the network encrypts content data with a TEK and the terminal decrypts the encrypted data with the TEK, the network should update a variety of encryption keys several times, and transmit the updated TEKs to the terminal. In this case, resources consumed between the network and the terminal to update the encryption keys may increase.

Therefore, a need exists for a method and apparatus for reducing resources in a network when encryption keys are updated.

SUMMARY OF THE INVENTION

An aspect of the present invention is to address at least the above-mentioned problems and/or disadvantages and to provide at least the advantages described below. Accordingly, an aspect of the present invention is to provide a method and apparatus for reducing a number of resources for creating an encryption key for broadcast service data and transmitting the encryption key to a terminal in a communication system.

Another aspect of the present invention is to provide a method and apparatus for reducing resources that a network needs to transmit an encryption key for broadcast service data to a terminal in a communication system.

Still another aspect of the present invention is to provide a method and apparatus in which a terminal receives an encryption key for broadcast service data from a network to create a Traffic Encryption Key (TEK), and decrypts received encrypted data with the TEK in a communication system.

In accordance with an aspect of the present invention, a method for providing a broadcast service in a communication system is provided. The method includes creating a seed key pair including a first key and a second key, transmitting the seed key pair to a terminal to which the broadcast service is to be provided, creating a certain number of encryption keys using the seed key pair, the certain number corresponding to a lifetime of the seed key pair, encrypting broadcast service data for the lifetime using the encryption keys, and broadcasting the encrypted broadcast service data.

In accordance with another aspect of the present invention, a method for receiving a broadcast service by a terminal in a communication system is provided. The method includes receiving a seed key pair including a first key and a second key, creating a certain number of encryption keys using the received seed key pair, the certain number corresponding to a lifetime of the seed key pair, and decrypting encrypted broadcast service data broadcasted for the lifetime using the encryption keys.

In accordance with a further aspect of the present invention, an apparatus for providing a broadcast service in a communication system is provided. The apparatus includes a seed key creator for creating a seed key pair including a first key and a second key, and for transmitting the seed key pair to a terminal to which the broadcast service is to be provided, through a transceiver, an encryption key creator for creating a certain number of encryption keys using the seed key pair, the certain number corresponding to a lifetime of the seed key pair, and a data encryptor for encrypting broadcast service data for the lifetime using the encryption keys, and for broadcasting the encrypted broadcast service data through the transceiver.

In accordance with another aspect of the present invention, an apparatus for receiving a broadcast service in a terminal for a communication system is provided. The apparatus includes a transceiver for receiving a seed key pair including a first key and a second key, an encryption key creator for creating a certain number of encryption keys using the received seed key pair, the certain number corresponding to a lifetime of the seed key pair, and a data decryptor for decrypting encrypted broadcast service data broadcasted for the lifetime, using the encryption keys.

In accordance with still another aspect of the present invention, an apparatus for providing a broadcast service in an Open Mobile Alliance BroadCAST (OMA BCAST) system is provided. The apparatus includes a Service Protection-Key Distribution unit (SP-KD) for creating a seed key pair including a first key and a second key, and for transmitting the seed key pair to a terminal to which the broadcast service is to be provided, and a Service Provider-Encryption unit (SP-E) for receiving the seed key pair from the SP-KD, for creating a certain number of encryption keys, the number of which corresponds to a lifetime of the received seed key pair, for encrypting broadcast service data for the lifetime using the encryption keys, and for transmitting the encrypted broadcast service data to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
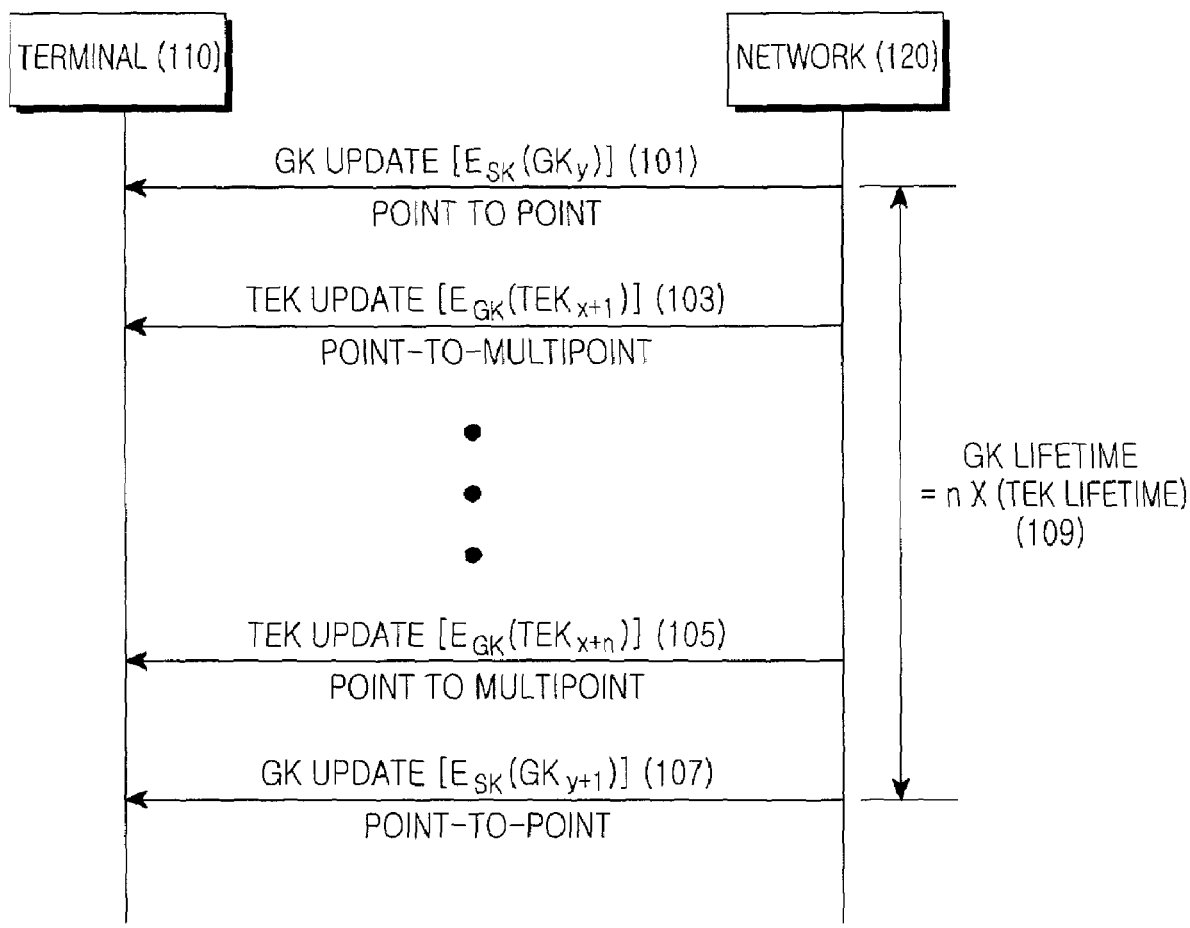
FIG. 1 illustrates an encryption key management between a network and a terminal in a conventional broadcast service system.
Figure 2:
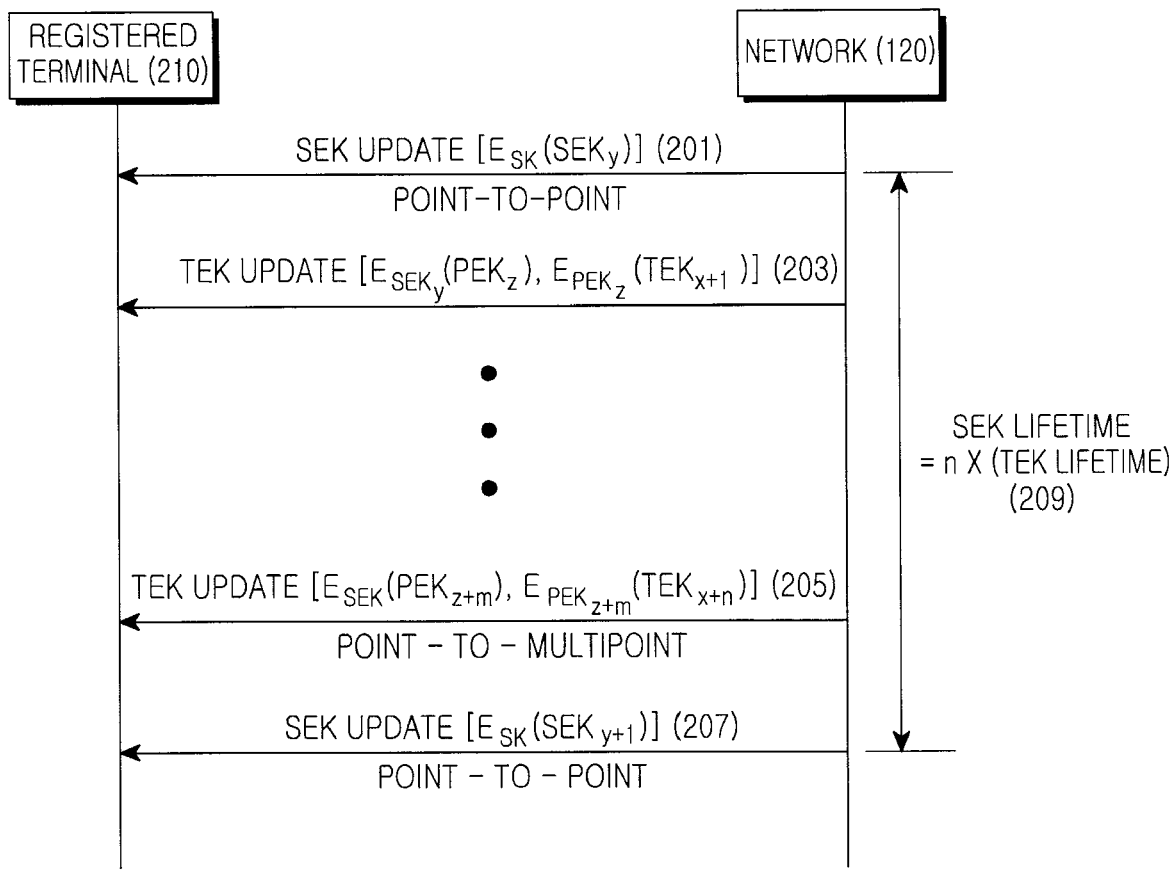
FIG. 2 illustrates an encryption key management in a registered terminal in a conventional Open Mobile Alliance BroadCAST (OMA BCAST)
Figure 3:
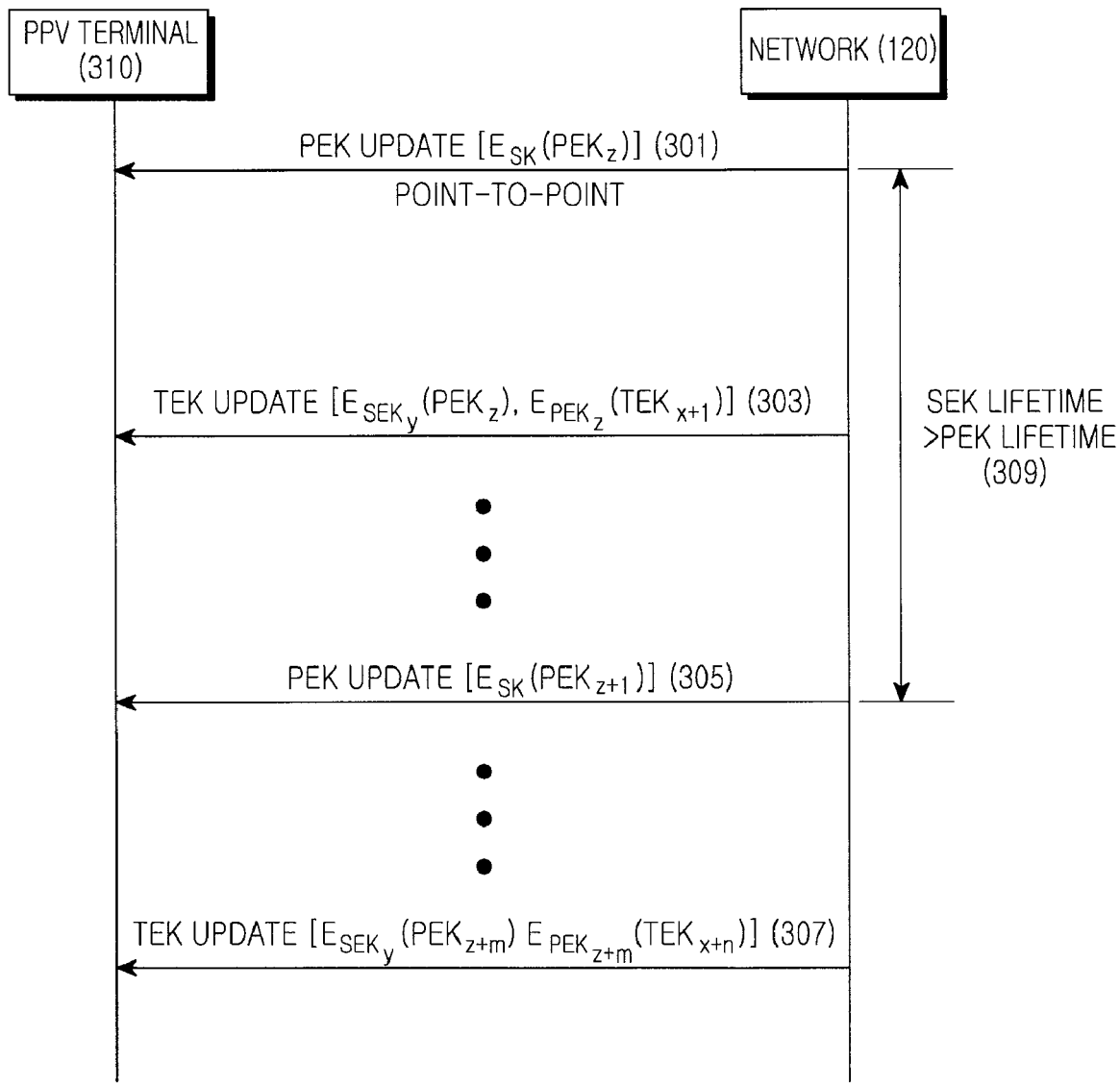
FIG. 3 illustrates an encryption key management in a Pay-Per-View (PPV) terminal in a conventional OMA BCAST.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A basic concept of exemplary embodiments of the present invention will be briefly described. In the exemplary embodiments of the present invention, a network providing a broadcast service creates a seed key pair used for creating Traffic Encryption Keys (TEKs) and transmits the seed key pair to a terminal. When using the seed key pair, the network and the terminal each create a certain number n of TEKs, where n corresponds to a lifetime of the seed key pair. The network encrypts data with the n TEKs and transmits the data to the terminal the certain number n of times. The terminal also decrypts the transmitted encrypted data with the n TEKs created by the terminal itself.

When transmission/reception of data is completed as all the n TEKs are used, a lifetime of the seed key pair expires and the network creates a next encryption key pair and transmits the encryption key pair to the terminal. However, if the terminal is a Pay-Per-View (PPV) terminal that has requested a particular program, the terminal sets a lifetime of the seed key pair according to a broadcast time of the particular program. Therefore, there is no need to update any more seed key pair. The network may be a base station or a server controlling the base station, or a server of a service provider providing broadcast services in a wireless communication system providing broadcast services.

The broadcast service method and apparatus proposed by exemplary embodiments of the present invention may be applied to broadcast services in a wireless communication system and also in a wired communication system.

Creation of the TEKs will be described below based on the foregoing basic concept.

Figure 4:
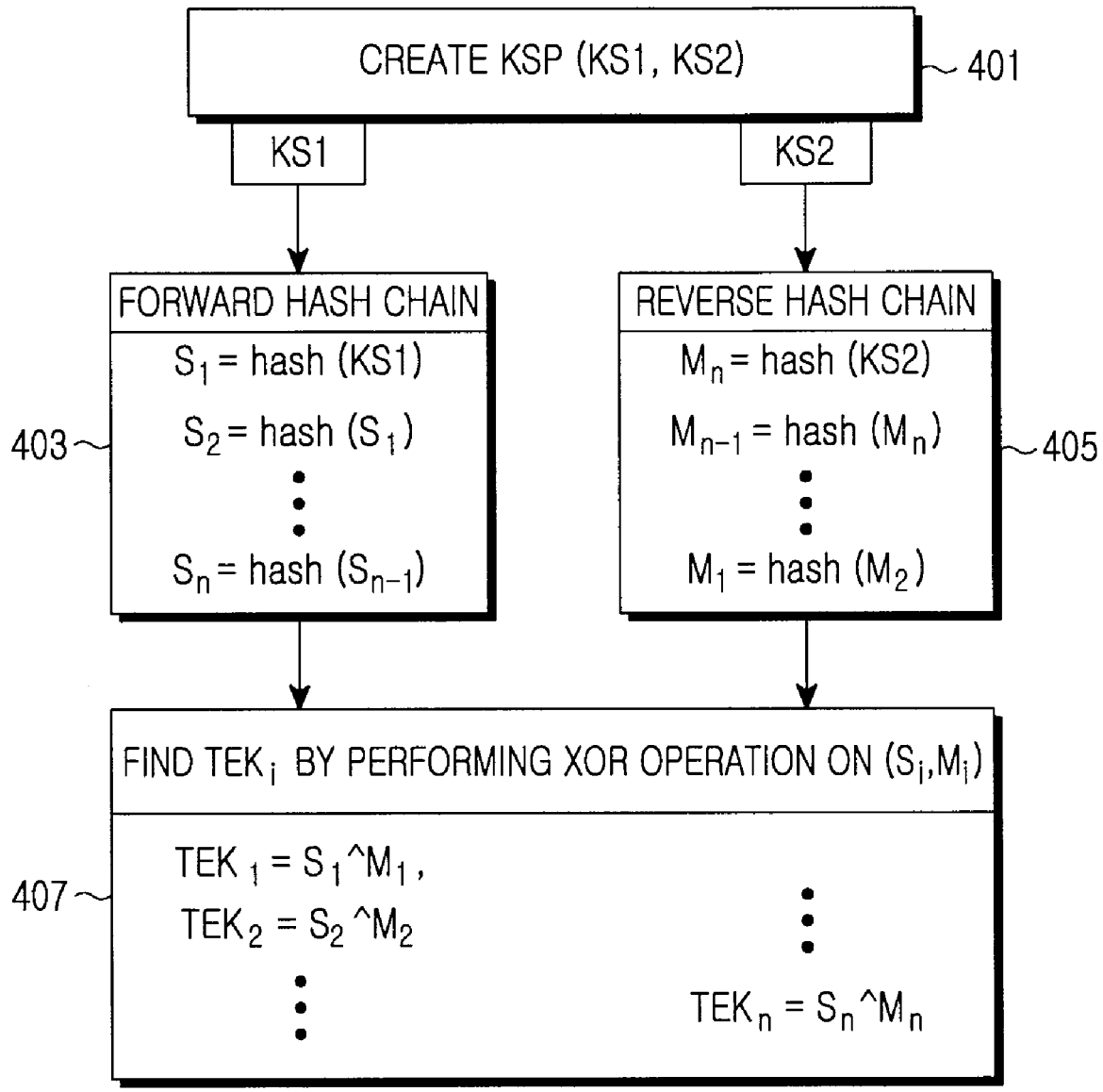
FIG. 4 illustrates a creation of encryption keys in a broadcast service system according to an exemplary embodiment of the present invention.

FIG. 4 illustrates a creation of encryption keys in a broadcast service system according to an exemplary embodiment of the present invention.

Referring to FIG. 4, an encryption key pair, called a Key Seed Pair (KSP), is created in step 401. The KSP includes two keys. That is, the KSP includes $KS_1$ and $KS_2$. The KSP may be randomly created in a network.

Thereafter, hash chains are applied to the $KS_1$ and the $KS_2$ in steps 403 and 405, respectively. That is, a forward hash chain is applied to the $KS_1$ in step 403, and a reverse hash chain is applied to the $KS_2$ in step 405. Steps 403 and 405 may be performed either simultaneously or with a time difference. Even with a time difference, any one of steps 403 and 405 may be performed first.

More specifically, in step 403, an $S_1$ is determined by applying a hash function to the $KS_1$ and an $S_2$ is found by applying the hash function to the $S_1$. Determination for up to an $S_n$ is performed in a similar manner.

The reverse hash chain in step 405 progresses in an opposite direction compared with the forward hash chain. That is, an $M_n$ is first found by applying a hash function to the $KS_2$, and an $M_{n-1}$ is determined by applying the hash function to the $M_n$. In this manner, up to an $M_1$ is determined by applying the hash function to the $M_2$. When steps 403 and 405 are completely performed, n $(S_i, M_i)$ pairs may be created, which are defined as a "Bidirectional Hash Pair (BHP)".

In step 407, n TEKs are found by applying a certain operation to the n BHPs determined in steps 403 and 405. The operation used may be an Exclusive OR (XOR) operation. That is, the TEKs may be found with an equation of $TEK_i = S_i$ XOR $M_i$.

In summary, one KSP ($KS_1$, $KS_2$) is first created, n BHPs ($S_i$, $M_i$) are created with the KSP, and n TEKs are created with the n BHPs ($S_i$, $M_i$). A process for creating the TEKs may be performed in a network and/or a terminal.

If the terminal is a registered terminal, the network transmits a KSP, and the network and the terminal determine n TEKs using the above-described method. Thereafter, the network may encrypt data, and the terminal may decrypt the encrypted data.

However, if the terminal is a PPV terminal, the network may illustrate a slight difference without using the KSP. That is, the network does not find a KSP, but finds an Access Valid Pair (AVP). Thereafter, the network transmits the AVP to the PPV terminal. The "AVP" refers to an $(S_i, M_j)$ information pair corresponding to a particular time period for which broadcast service is provided to the PPV terminal. The PPV terminal finds a value of up to an $S_j$ by applying a forward hash chain to the $S_i$, and finds a value of up to an $M_i$ by applying a reverse hash chain to the $M_j$. That is, the PPV terminal creates m BHPs from the AVP. If the number of BHPs created in the PPV terminal is m, m=j−i+1. In conclusion, the PPV terminal finds m TEKs using the m BHPs.

In summary, an encryption key pair transmitted from the network to the registered terminal is KSP=$(KS_1, KS_2)$, and an encryption key pair transmitted to the PPV terminal is AVP= $(S_i, M_j)$. Although both the KSP and the AVP are different in name, the KSP and the AVP are essentially equal in that they are information related to data encryption for a time period of a broadcast service provided to the terminal. That is, if information related to data encryption at a start time of a reference period of the broadcast service is $KS_1$ and information related to data encryption at an end time is $KS_2$, the $S_i$ may indicate information related to data encryption at a start time in an arbitrary time period belonging to the reference period, and $M_j$ may indicate information related to data encryption at an end time in the arbitrary time period.

For example, if a user can purchase a coupon for a broadcast service month by month, a terminal of the user who purchased the one-month coupon may be considered as a registered terminal. A KSP, i.e., $(KS_1, KS_2)$, currently transmitted to the registered terminal may indicate information related to data encryption at a start time and an end time of the one month, respectively. If a user purchased a coupon for a single drama, a terminal of the user becomes a PPV terminal, and an AVP, i.e., $(S_i, M_j)$, transmitted to the PPV terminal at this time may indicate information related to data encryption at a start time and an end time of the drama, respectively.

In the foregoing description, the KSP information was used in pairs for the registered terminal. In some cases, however, one of the KSP information, i.e., one of $KS_1$ and $KS_2$, may be used instead of the information pair, for the registered terminal. Since the number of information pieces is not two, there is no need to identify the information with subscripts. Therefore, the information may be simply named "KS." The KS may be information related to data encryption at a start time or an end time of a subscription period of the registered terminal. That is, when it is determined to apply a reverse hash chain to a KS, the KS may indicate information related to data encryption at an end time of a broadcast service. If it is determined to apply a forward hash chain to the KS, the KS may become information related to data encryption at a start time of the broadcast service.

A reverse hash chain may be applied to the KS in the following manner.

A network creates a KS and delivers the KS to a registered terminal. In this case, other parameters (e.g., the number of TEKs, a lifetime of the TEK and the like) associated with the KS may also be transmitted together.

To create n TEKs, a hash function is applied to the KS in a reverse direction n times. That is, TEKs are created as follows:

$TEK_n$=hash(KS), $TEK_{n-1}$=hash($TEK_n$), $TEK_2$=hash($TEK_3$) ... , $TEK_1$=hash($TEK_2$).

Additionally, the KSP or the AVP may be combined with the conventional SEK or PEK. For example, in an OMA BCAST, the KSP or the AVP may be encrypted by the SEK and PEK, and delivered to the terminal. The TEK may be created from the KSP or the AVP in the network and the terminal as described above.

Encryption key management methods of an exemplary embodiment of the present invention by the network and the terminal will be described with reference to FIGS. 5 and 6, respectively.

Figure 5:
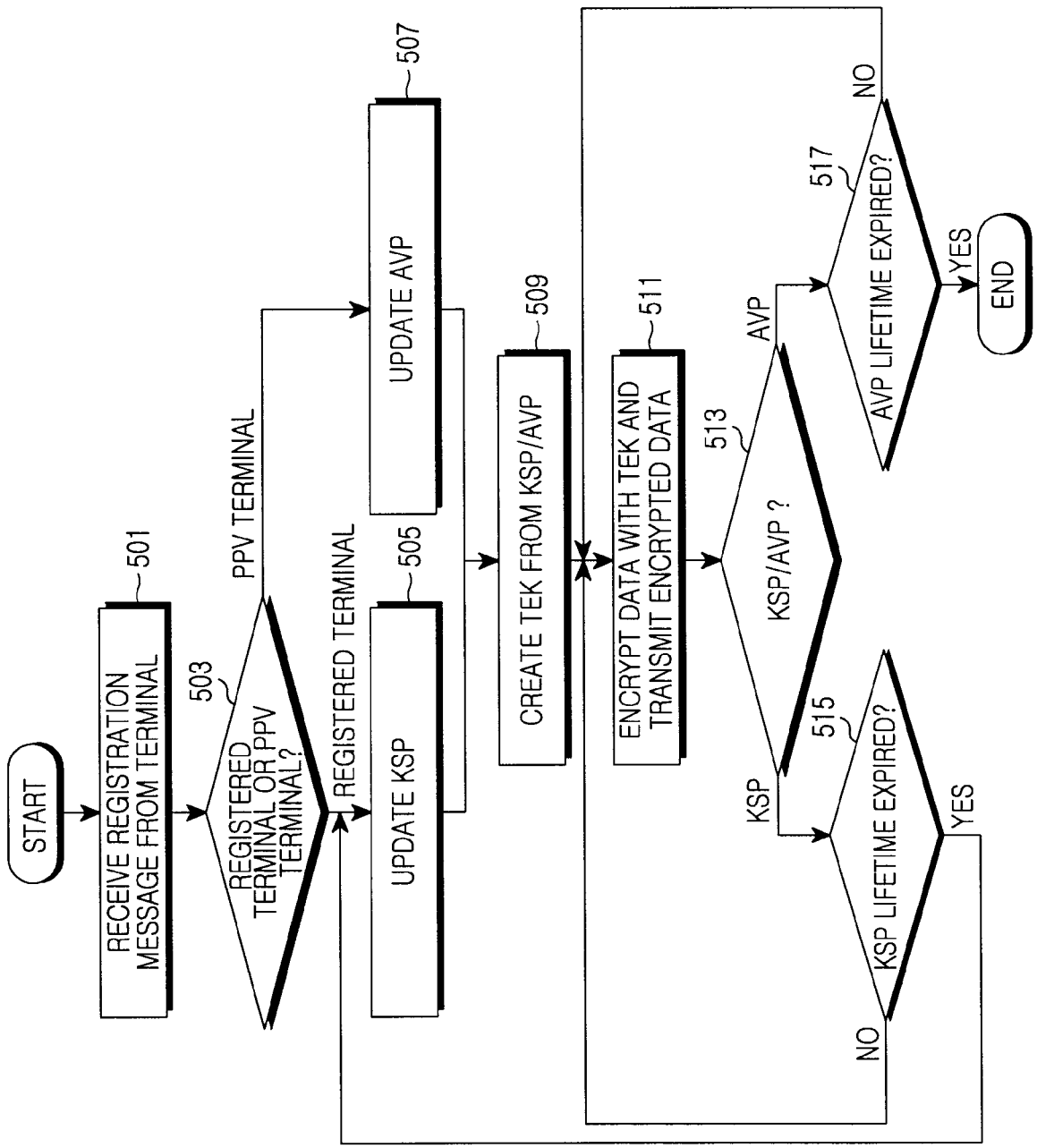
FIG. 5 illustrates an encryption key management method by a network in a broadcast service system according to an exemplary embodiment of the present invention.

FIG. 5 illustrates an encryption key management method by a network in a broadcast service system according to an exemplary embodiment of the present invention.

Referring to FIG. 5, a network receives a registration message from a terminal in step 501. The "registration message" refers to a message including terminal registration information that a terminal uses to receive a service or a program from the network. In step 503, the network determines if the terminal is a registered terminal or a PPV terminal, based on the registration message.

Determining if the terminal is a registered terminal or a PPV terminal may be performed in various manners. For example, a registration message transmitted from a terminal to the network may include a separate identifier indicating whether the terminal is a registered terminal or a PPV terminal, or the network may be allowed by an authentication server (not illustrated) connected to the network to inquire if the terminal is a registered terminal or a PPV terminal.

The network proceeds to step 505 if the terminal is a registered terminal, and proceeds to step 507 if the terminal is a PPV terminal. In step 505, the network updates (i.e., creates and transmits) a KSP to the terminal.

In step 507, the network updates an AVP. That is, in step 507, the network creates an AVP and transmits the AVP to the PPV terminal. Thereafter, in step 509, the network creates TEKs by applying forward and reverse hash chains to the KSP or the AVP. The network will create n TEKs using the KSP if the terminal is a registered terminal, and create m TEKs using the AVP if the terminal is a PPV terminal. In step 511, the network encrypts data using the TEKs and transmits the encrypted data to the terminal. In step 513, the network determines if the TEKs are created using the KSP or the AVP, and experiences different processes according to the result. That is, if the current TEK was created using the KSP, the network determines in step 515 whether a lifetime of the KSP has expired. If the lifetime of the KSP has expired, the network returns to step 505 and updates the next KSP. If the lifetime of the KSP has not expired, the network returns to step 511 where it encrypts data using the next TEK and transmits the encrypted data. However, if the current TEK was created using the AVP, the network determines in step 517 whether a lifetime of the AVP has expired. If the lifetime of the AVP has not expired, the network returns to step 511 where it encrypts data using the next TEK and transmits the encrypted data. However, if the lifetime of the AVP has expired, the network ends all processes since there is no need to update the AVP any longer.

Figure 6:
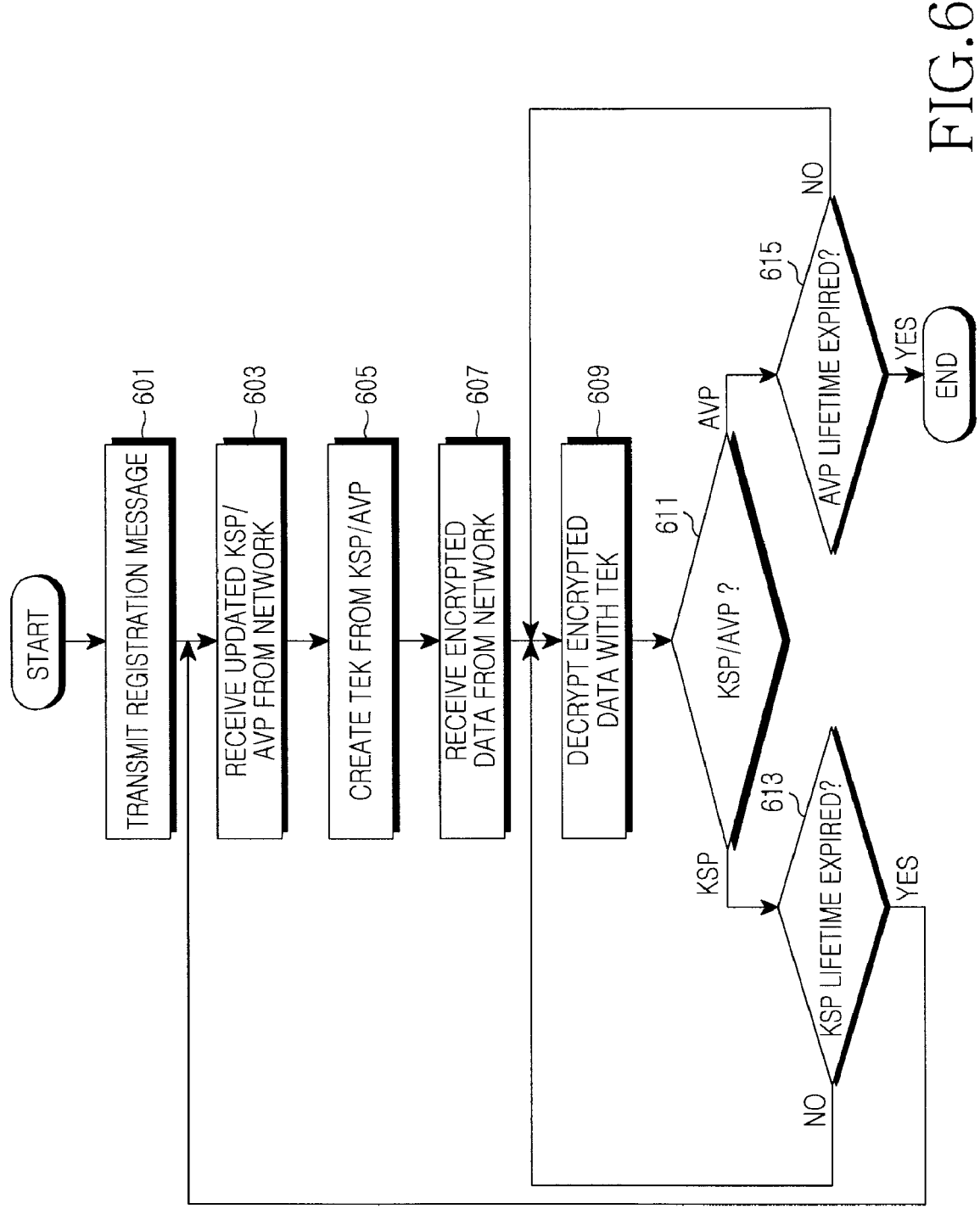
FIG. 6 illustrates an encryption key management method by a terminal in a broadcast service system according to an exemplary embodiment of the present invention.

FIG. 6 illustrates an encryption key management method by a terminal in a broadcast service system according to an exemplary embodiment of the present invention.

Referring to FIG. 6, a terminal transmits a registration message to a network in step 601 and receives an updated KSP or AVP from the network in step 603. That is, the terminal receives the KSP if it is a registered terminal and receives the AVP if it is a PPV terminal. In step 605, the terminal creates a TEK using the KSP or the AVP. In step 607, the terminal receives encrypted data from the network. In step 609, the terminal decrypts the encrypted data using the TEK. The following operation varies according to whether the TEK was created using the KSP or the AVP.

If the TEK was created using the KSP, in other words, if the terminal is a registered terminal, the terminal proceeds to step 613. If it is determined in step 613 that a lifetime of the KSP has expired, the terminal returns to step 603 and receives an updated KSP. However, if the lifetime of the KSP has not expired, the terminal returns to step 609 and decrypts the encrypted data with the next TEK created using the current KSP.

However, if the TEK was created with the AVP in step 611, in other words, if the terminal is a PPV terminal, the terminal proceeds to step 615. If a lifetime of the AVP has not expired in step 615, the terminal returns to step 609 and decrypts the encrypted data with the TEK continuously. However, if the lifetime of the AVP has expired, the terminal terminates without performing any operation since it has decrypted all received encrypted data.

Figure 9:
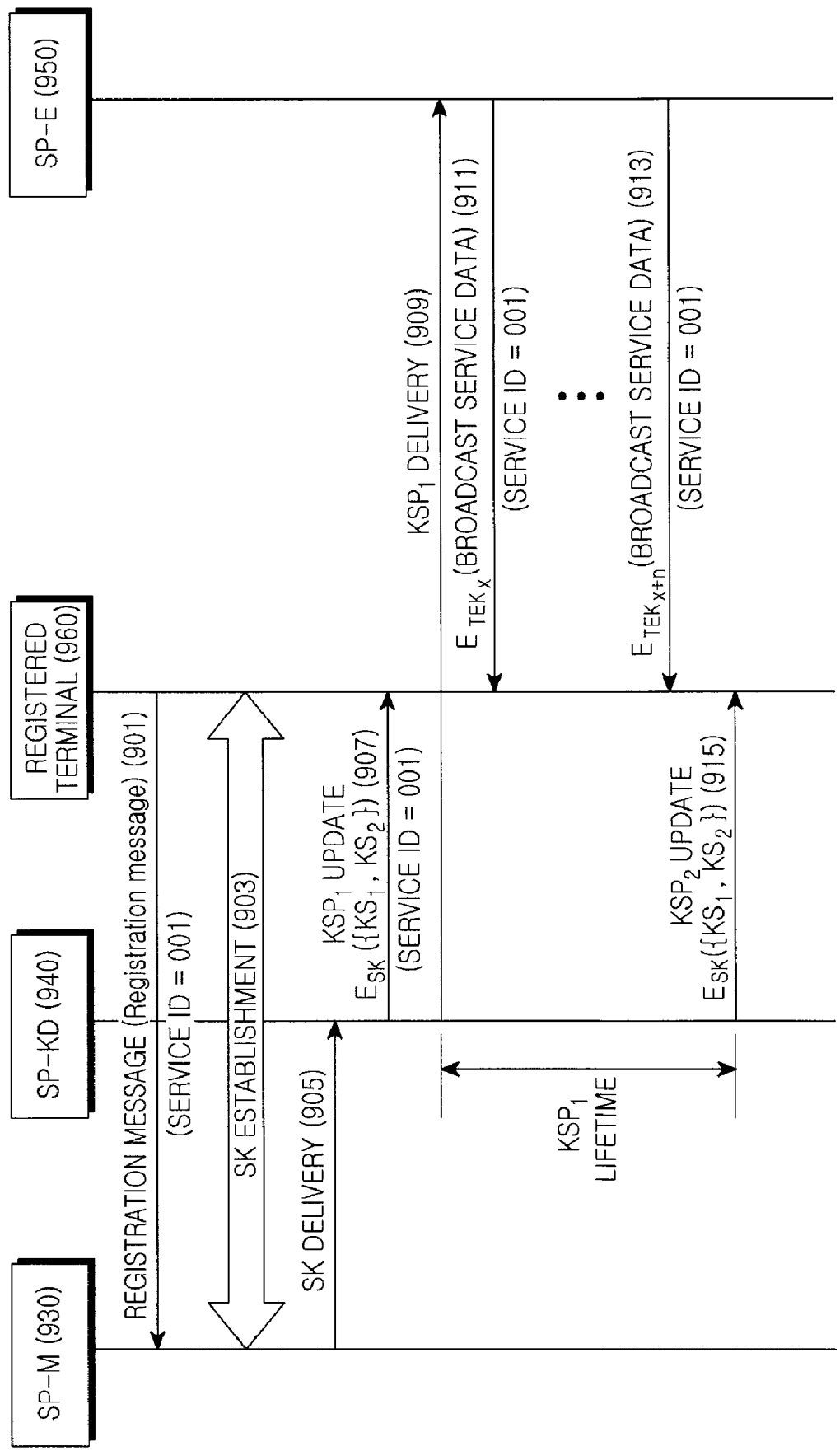
FIG. 9 illustrates an operation of each entity in an encryption key management for a registered terminal in an OMA BCAST according to an exemplary embodiment of the present invention.
Figure 10:
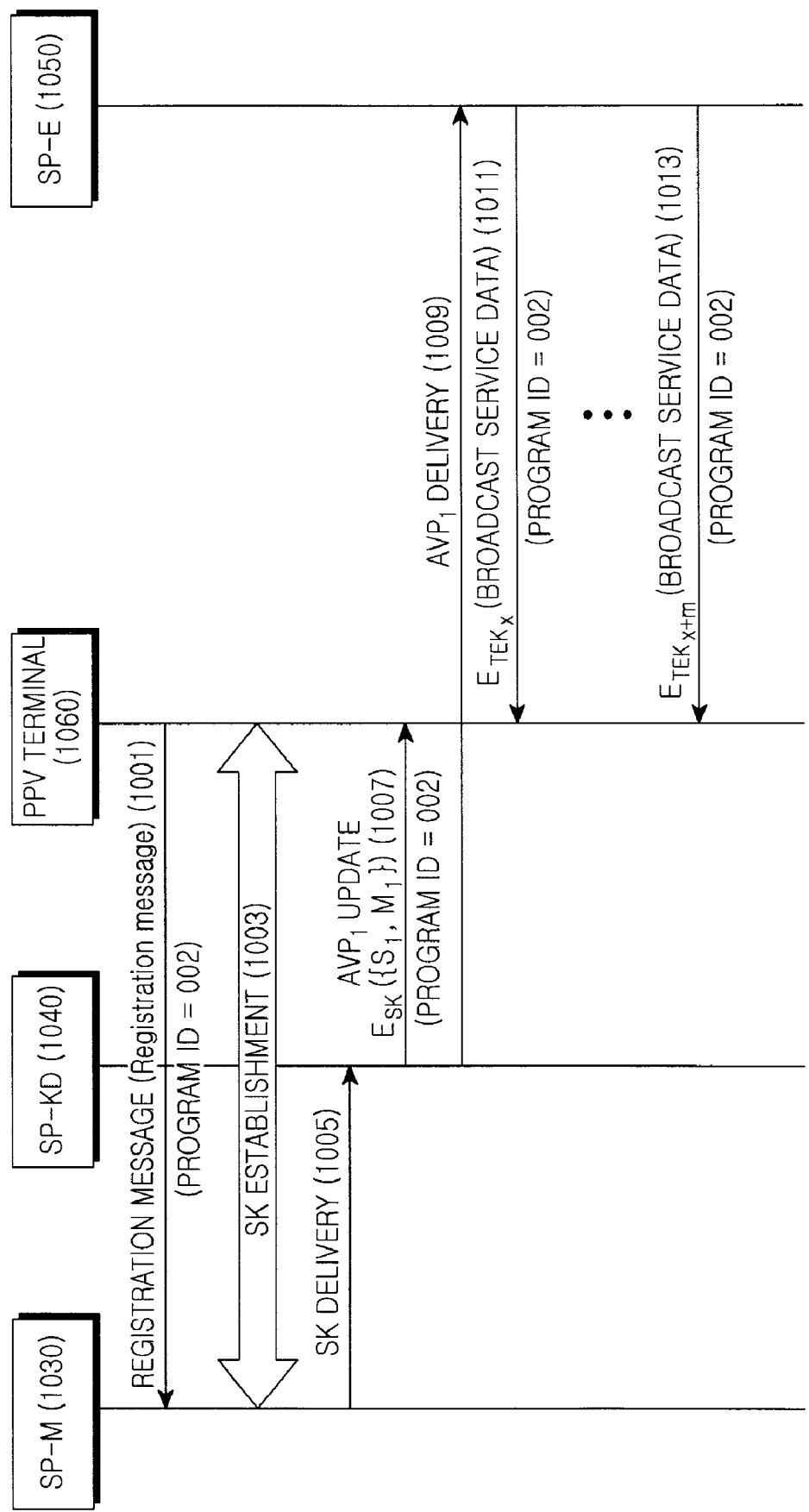
FIG. 10 illustrates an operation of each entity in an encryption key management for a Pay-Per-View (PPV) terminal in an OMA BCAST according to an exemplary embodiment of the present invention.
Figure 11:
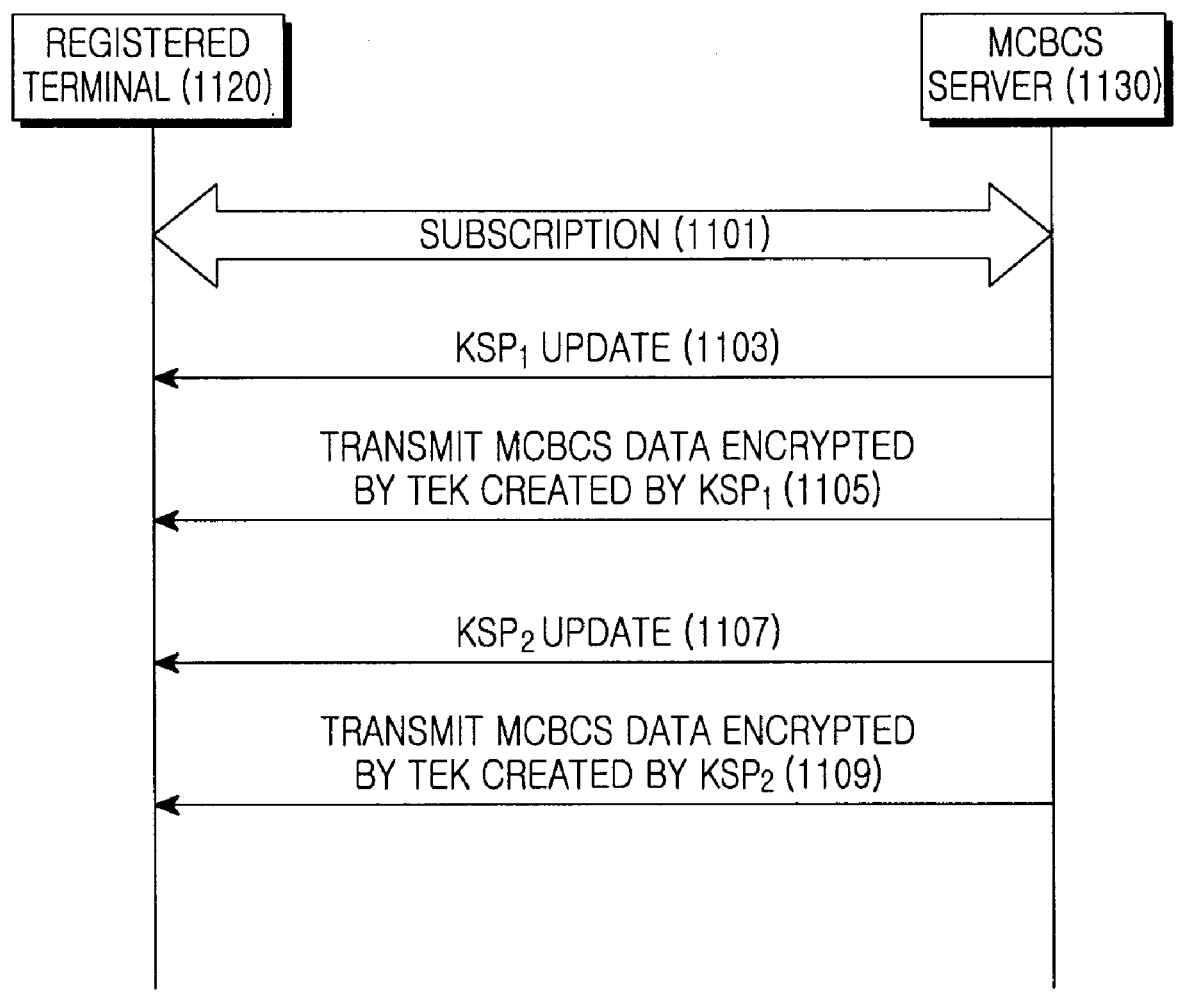
FIG. 11 illustrates encryption key management for a registered terminal in a Worldwide Inter-operability for Microwave Access (WiMax) broadcast service system according to an exemplary embodiment of the present invention.
Figure 12:
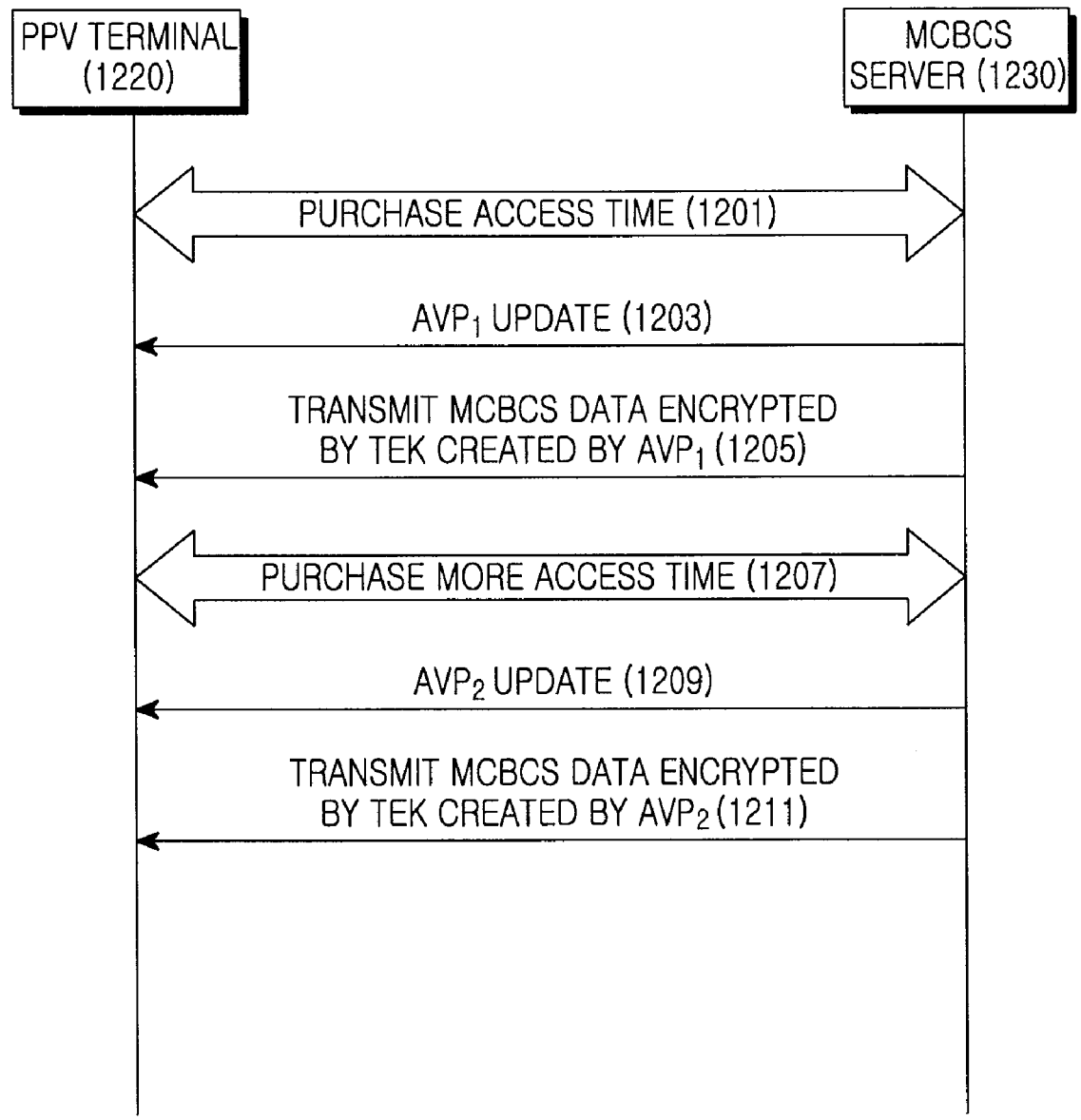
FIG. 12 illustrates an encryption key management for a PPV terminal in a WiMax broadcast system according to an exemplary embodiment of the present invention.

With reference to FIGS. 7 to 12, a description will now be made in which exemplary embodiments of the present invention described in connection with FIGS. 4 to 6 are applied to different broadcast systems. FIGS. 7 to 10 illustrate possible examples of a registered terminal and a PPV terminal in an OMA BCAST, and FIGS. 11 and 12 illustrate examples applicable to a registered terminal and a PPV terminal in a Worldwide Inter-operability for Microwave Access (WiMax) broadcast service system.

Figure 7:
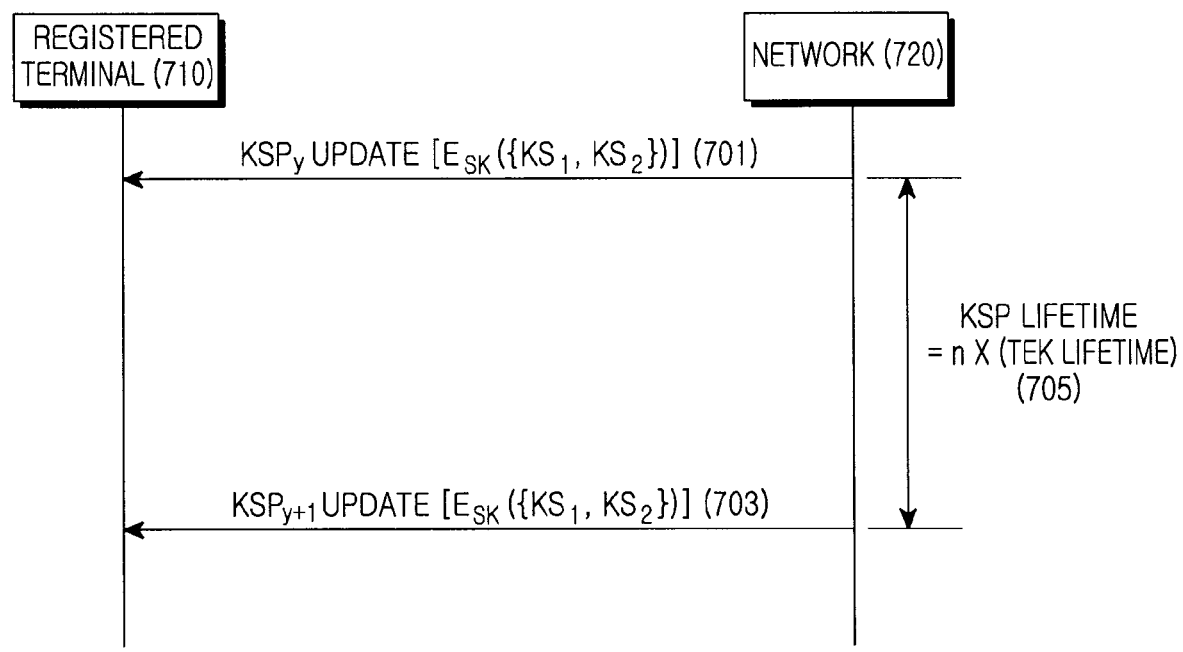
FIG. 7 illustrates an exemplary encryption key management applied to a registered terminal in an OMA BCAST according to an exemplary embodiment of the present invention.

FIG. 7 illustrates an exemplary encryption key management applied to a registered terminal in an OMA BCAST according to an exemplary embodiment of the present invention.

Referring to FIG. 7, a network 720 updates a KSP ($KSP_y$) for an arbitrary call in step 701. That is, the network 720 encrypts a $KS_1$ and a $KS_2$ with a Security Key (SK) and transmits the $KS_1$ and $KS_2$ to a registered terminal 710. The network 720 creates n BHPs with the KSP, creates n TEKs from the BHPs, encrypts data using the n TEKs, and transmits the encrypted data to the registered terminal 710.

The registered terminal 710 creates TEKs with the KSP in the same manner as the network 720, and decrypts the encrypted data received from the network 720. If data transmission/reception is completed as all of n TEKs are used, a lifetime of the KSPY expires 705. Therefore, the network 720 updates the next KSP $KSP_{y+1}$ in step 703.

Figure 8:
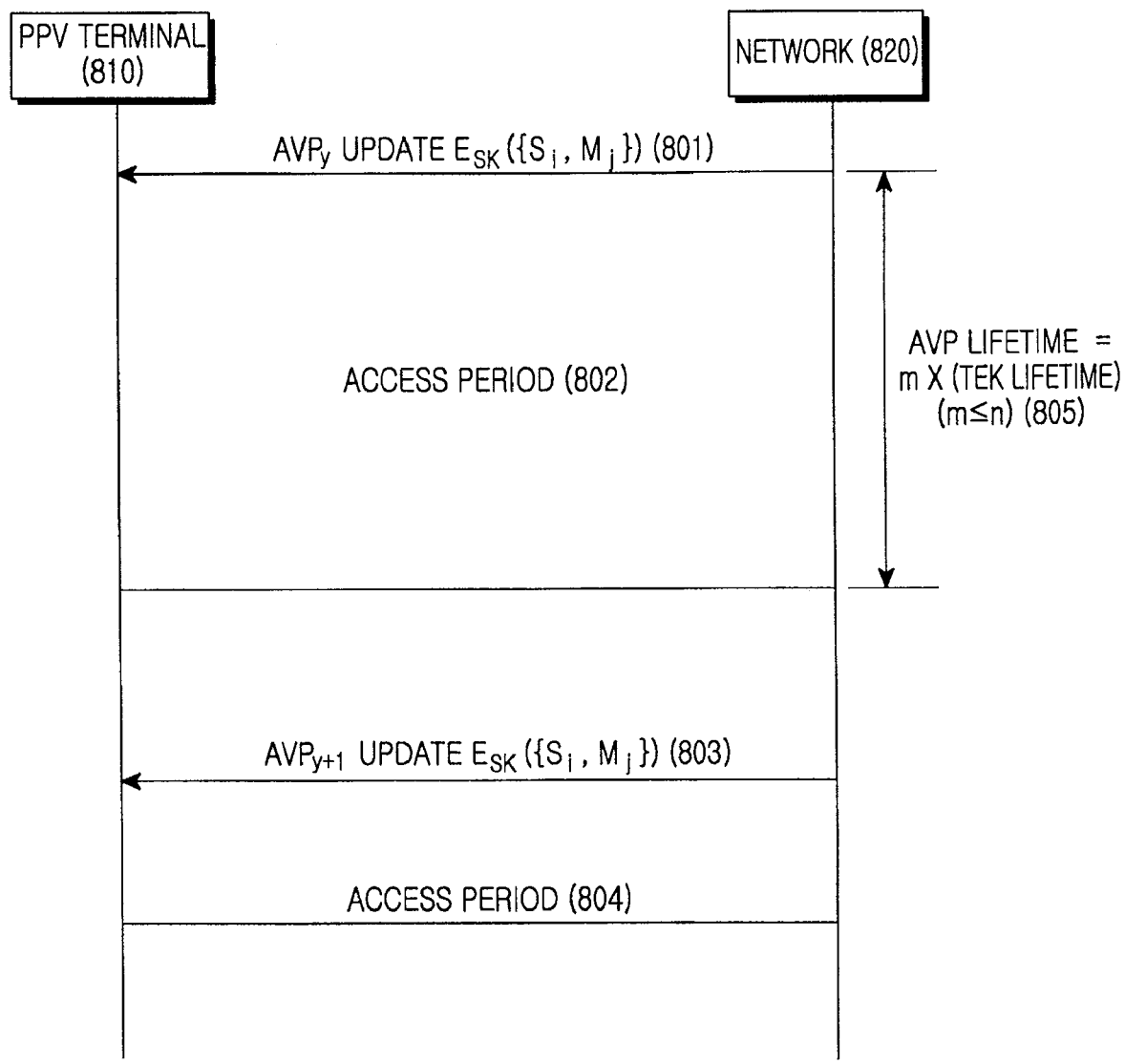
FIG. 8 illustrates an exemplary encryption key management applied to a PPV terminal in an OMA BCAST according to an exemplary embodiment of the present invention.

FIG. 8 illustrates an exemplary encryption key management applied to a PPV terminal in an OMA BCAST according to an exemplary embodiment of the present invention.

Referring to FIG. 8, if a PPV terminal 810 has purchased a broadcast service available for a specific access period, a network 820 updates (i.e., creates and transmits) an AVP to the PPV terminal 810 in step 801. That is, the network 820 encrypts a ($S_i$, $M_j$) pair using an SK and transmits the result to the PPV terminal 810.

The following operation of the PPV terminal 810 is similar to the PPV terminal described above. That is, the PPV terminal 810 applies forward and reverse hash chains to the received ($S_i$, $M_j$) pair. Then, values of S={$S_i$, $S_{i+1}$, $S_{i+2}$, . . . $S_{j-1}$, $S_j$} and M={$M_{j-1}$, $M_{j-2}$, . . . , $M_{i+1}$, $M_i$} are determined. Thereafter, the PPV terminal 810 may find m TEKs of $TEK_i$~$TEK_j$ by performing an XOR operation on the determined values. In this case, m=j−i+1. That is, the value of m may be determined from the ($S_i$, $M_j$). Here, a lifetime of ($S_i$, $M_j$)=m×(lifetime of TEK), and m is less than or equal to n (m≦n), because n indicates the number of TEKs, which corresponds to a lifetime of the KSP, and m indicates the number of TEKs, which corresponds to a lifetime of the AVP 805.

If an access period 802 has expired and a user has purchased a broadcast service available for an additional access period, the network 820 updates a new AVP and transmits the AVP to the PPV terminal 810 in step 803. The PPV terminal 810 may receive the broadcast service for a new access period in step 804.

FIG. 9 illustrates an operation of each entity in an encryption key management for a registered terminal in an OMA BCAST according to an exemplary embodiment of the present invention.

The description of FIG. 7 has been given with two entities, such as a registered terminal and a network. However, the network may consist of a plurality of entities in an OMA BCAST. FIG. 9 illustrates a call flow between a terminal and the entities constituting the network.

The entities of the OMA BCAST system will first be described, which may be applied to FIGS. 9 and 10 in common. A Service Protection-Management unit (SP-M) 930 (or 1030) has a function of registering and managing terminals. A Service Protection-Key Distribution unit (SP-KD) 940 (or 1040) creates a KSP or an AVP and delivers the KSP or the AVP to terminals. In addition, a Service Provider-Encryption unit (SP-E) 950 (or 1050) has a function of creating a TEK(s) using the KSP or AVP provided from the SP-KD 940 (or 1040), encrypting data with the TEK and directly transmitting the encrypted data to terminals.

Referring to FIG. 9, a registered terminal 960 transmits a registration message to the SP-M 930 in step 901. The registration message includes a service ID (for example, 001) of a broadcast service the registered terminal 960 desires to receive. In step 903, the SP-M 930 establishes an SK with the registered terminal 960. That is, the SP-M 930 establishes the same SK as that of the registered terminal 960 by exchanging necessary information in order to share the SK with the registered terminal 960. In step 905, the SP-M 930 delivers the SK to the SP-KD 940. In step 907, the SP-KD 940 updates a KSP for the registered terminal 960 by creating and delivering the first KSP ($KSP_1$) to the registered terminal 960. In step 909, the SP-KD 940 delivers the $KSP_1$ to the SP-E 950. The SP-E 950 creates n TEKs using the $KSP_1$, encrypts broadcast data with one (indicated by $TEK_x$) of the created n TEKs, and transmits the encrypted data to the registered terminal 960 in step 911. In step 913, data encrypted with the created $n^{th}$ TEK is transmitted to the registered terminal 960. Since all of the created n TEKs have been used in step 913, a lifetime of the $KSP_1$ has expired. Therefore, the SP-KD 940 updates (i.e., creates and transmits) the second KSP ($KSP_2$) to the registered terminal 960 in step 915. The succeeding process is equal to the process after the $KSP_1$ is updated.

FIG. 10 illustrates an operation of each entity in an encryption key management for a PPV terminal in an OMA BCAST according to an exemplary embodiment of the present invention.

A description of FIG. 10 will be given by focusing on the difference from FIG. 9. In the example of FIG. 10, the terminal is a PPV terminal 1060. Therefore, a registration message that the PPV terminal 1060 transmits in step 1001, includes a program ID (for example, 002), which denotes that the PPV terminal 1060 requires a particular broadcast program. In step 1007, the SP-KD 1040 updates an $AVP_1$ and transmits the $AVP_1$ to the PPV terminal 1060. In step 1013, the SP-E 1050 encrypts data using an $m^{th}$ TEK ($TEK_{x+m}$) and transmits the encrypted data to the PPV terminal 1060. After expiration of a lifetime of the $AVP_1$, the next $AVP_2$ is not updated automatically. Instead, the $AVP_2$ is updated when a user additionally requests a broadcast service for a specific time period. Other operations (i.e., SK Establishment 1003, SK Delivery 1005, AVP₁ Delivery 1009, and transmitting the encrypted data 1011) of FIG. 10 are similar to the operations (i.e., SK Establishment 903, SK Delivery 905, KSP₁ Delivery 909, and transmitting the encrypted data 1011) in FIG. 9.

FIG. 11 illustrates an encryption key management for a registered terminal in a WiMax broadcast service system according to an exemplary embodiment of the present invention. In the WiMax broadcast service system, encryption keys are managed not by a plurality of entities as in the OMA BCAST, but by one Multicast and Broadcast Service (MCBCS) server.

Referring to FIG. 11, when a registered terminal 1120 progresses with a procedure for subscribing to a broadcast service provided from an MCBCS server 1130 in step 1101, the MCBCS server 1130 updates the first KSP (KSP₁) and transmits the KSP₁ to the registered terminal 1120 in step 1103. At the same time, the MCBCS server 1130 and the registered terminal 1120 each create n TEKs. In step 1105, the MCBCS server 1130 encrypts data using the created n TEKs and transmits the encrypted data to the registered terminal 1120. When a lifetime of the KSP₁ expires as all of the n TEKs are used, the MCBCS server 1130 updates the second KSP (KSP₂) and transmits the KSP₂ to the registered terminal 1120 in step 1107. At the same time, the MCBCS server 1130 and the registered terminal 1120 each create n TEKs using the KSP₂. In step 1109, data encrypted with the created n TEKs is transmitted to the registered terminal 1120.

FIG. 12 illustrates an encryption key management for a PPV terminal in a WiMax broadcast system according to an exemplary embodiment of the present invention.

A description of FIG. 12 will be given by focusing on the difference from FIG. 11. In step 1201, a PPV terminal 1220 purchases access time for which it will access an MCBCS server 1230 to receive a broadcast service for a particular time period. In step 1203, an AVP₁ corresponding to the particular time period is updated. In addition, the MCBCS server 1230 and the PPV terminal 1220 each create a TEK using the AVP₁. In step 1205, data encrypted by the TEK created with the AVP₁ is transmitted from the MCBCS server 1230 to the PPV terminal 1220. Here, an AVP₂ is not updated automatically upon expiration of a lifetime of the AVP₁. That is, when the PPV terminal 1220 purchases more access time for a particular broadcast service in step 1207, the MCBCS server 1230 creates and transmits the AVP₂ to the PPV terminal 1220 in step 1209. Another operation (i.e., the data encrypted with the created n TEKs is transmitted to the registered terminal 1211) of FIG. 12 is similar to the operation (i.e., data encrypted with the created n TEKs is transmitted to the registered terminal 1120) in FIG. 11.

Figure 13:
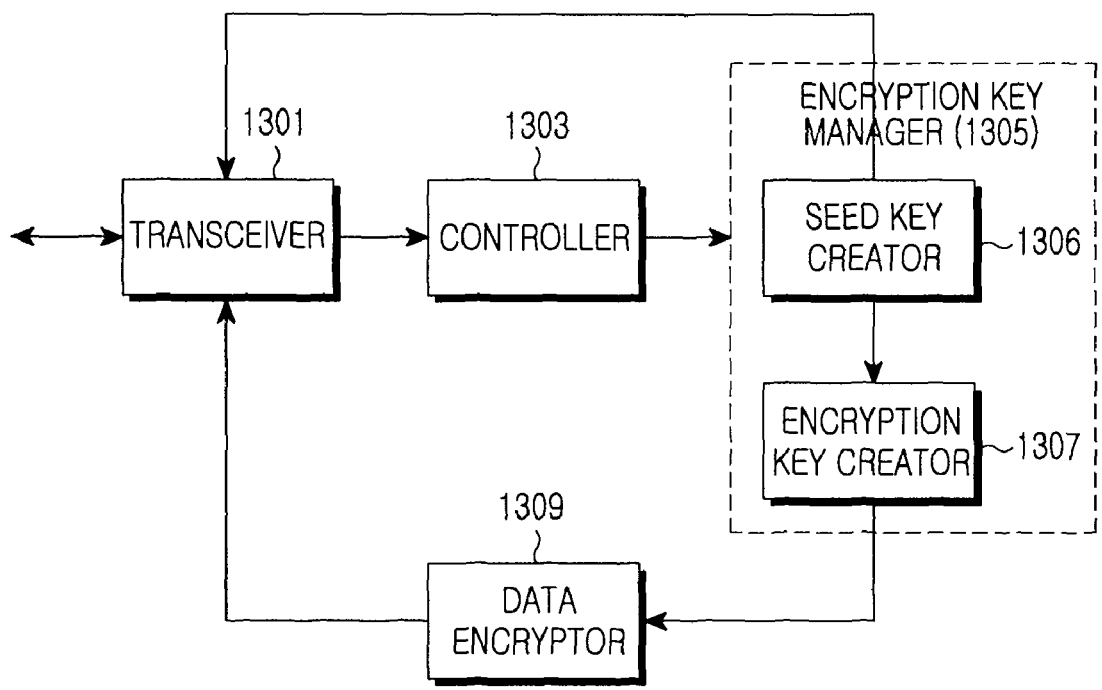
FIG. 13 illustrates a network apparatus for managing encryption keys in a broadcast service system according to an exemplary embodiment of the present invention.

FIG. 13 illustrates a network apparatus for managing encryption keys in a broadcast service system according to an exemplary embodiment of the present invention.

A transceiver 1301 receives a registration message including registration information of a terminal from the terminal, and provides the registration message to a controller 1303. The controller 1303 determines whether the terminal is a registered terminal or a PPV terminal based on the registration information included in the received registration message, and controls a seed key creator 1306 in an encryption key manager 1305 according to the determination result.

The encryption key manager 1305, under the control of the controller 1303, creates a seed key appropriate for the type of terminal and creates an encryption key, i.e., a TEK, using the created seed key. More specifically, the encryption key manager 1305 includes the seed key creator 1306 and an encryption key creator 1307. The seed key creator 1306 creates a seed key appropriate for the type of terminal. That is, the seed key creator 1306 creates a KSP if the terminal is a registered terminal and creates an AVP if the terminal is a PPV terminal. The created KSP or AVP is provided to the transceiver 1301 and the encryption key creator 1307. The KSP or AVP provided to the transceiver 1301 is transmitted to the terminal, undergoing update. The terminal creates TEKs using the updated KSP or AVP.

Meanwhile, the encryption key creator 1307, which has received the KSP or the AVP, creates as many TEKs as the number corresponding to a lifetime of the KSP or the AVP. That is, the encryption key creator 1307 will create n TEKs using the KSP when the terminal is a registered terminal, and create m TEKs using the AVP when the terminal is a PPV terminal. In creating TEKs from the KSP or the AVP, forward and reverse hash chains may be used as described in connection with FIG. 4.

The TEKs are provided from the encryption key creator 1307 to a data encryptor 1309, and the data encryptor 1309 encrypts data with the TEKs and transmits the encrypted data to the terminal through the transceiver 1301.

Figure 14:
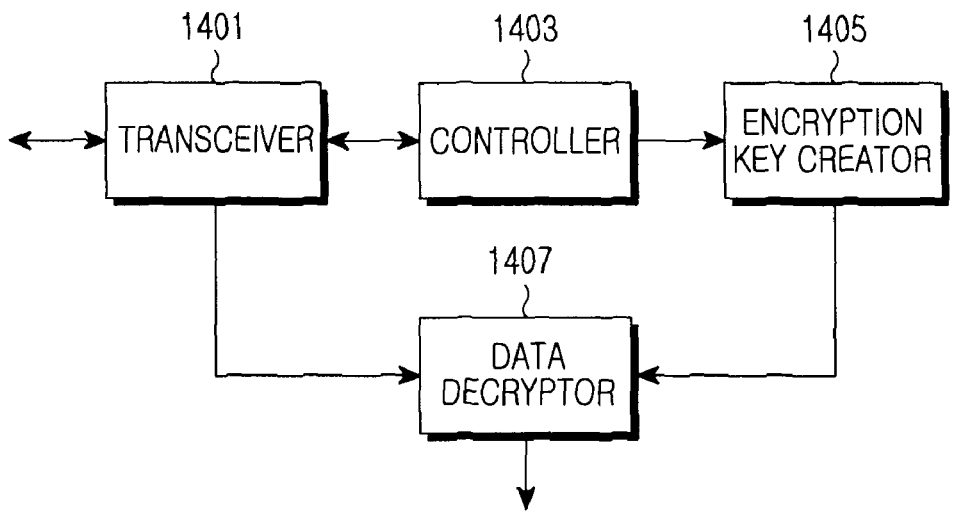
FIG. 14 illustrates an encryption key management apparatus of a terminal in a broadcast service system according to an exemplary embodiment of the present invention.

FIG. 14 illustrates an encryption key management apparatus of a terminal in a broadcast service system according to an exemplary embodiment of the present invention.

A controller 1403 creates a registration message including registration information of the terminal, and transmits the registration message to a network through a transceiver 1401. Further, the controller 1403 receives a seed key, i.e., a KSP or an AVP, from the network through the transceiver 1401 in response to the registration message, and provides the KSP or the AVP to an encryption key creator 1405. The encryption key creator 1405 updates the provided KSP or AVP, creates as many TEKs as the number corresponding to a lifetime of the updated KSP or AVP, and provides the TEKs to a data decryptor 1407.

Meanwhile, upon receipt of encrypted data from the network, the transceiver 1401 forwards the received encrypted data to the data decryptor 1407. The data decryptor 1407 decrypts the encrypted data using the TEKs provided from the encryption key creator 1405. An operation after the data decryption does not apply to exemplary embodiments of the present invention.

As is apparent from the foregoing description, a network may create and transmit certain encryption keys to a terminal a certain time, instead of creating and transmitting a variety of encryption keys to a terminal every time the network transmits broadcast service data to the terminal. Thereby, complexity of the network is reduced. In this manner, the number of creating and transmitting encryption keys to the terminal is reduced, allowing efficient use of communication resources. Further, the terminal may create TEKs by itself by receiving an encryption key a certain time, and decrypt received encrypted data using the created TEKs, contributing to an increase in structural efficiency of the terminal.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a broadcast service in a communication system, the method comprising:
   creating a seed key pair comprising a first key and a second key;
   transmitting the seed key pair to a terminal to which the broadcast service is to be provided;
   creating a certain number of one or more encryption keys using the seed key pair, the certain number of encryption keys corresponding to a lifetime of the seed key pair;
   encrypting broadcast service data for the lifetime using the encryption keys; and
   broadcasting the encrypted broadcast service data,
   wherein the creating of the certain number of encryption keys comprises:
      creating a certain number of one or more forward encryption keys by applying a forward hash chain to the first key;
      creating a certain number of one or more reverse encryption keys by applying a reverse hash chain to the second key; and
      creating a certain number of one or more traffic encryption keys using the forward encryption keys and the reverse encryption keys.

2. The method of claim 1, wherein the creating of the certain number of traffic encryption keys comprises performing an Exclusive OR on the forward encryption keys and the reverse encryption keys.

3. The method of claim 1, further comprising creating and transmitting a next seed key pair to the terminal, when the terminal is a registered terminal and the lifetime has expired.

4. The method of claim 1, further comprising creating and transmitting a next seed key pair to the terminal upon receipt of a request for an additional broadcast service from the terminal, when the terminal is a Pay-Per-View (PPV) terminal and the lifetime has expired.

5. A method for receiving a broadcast service by a terminal in a communication system, the method comprising:
   receiving a seed key pair comprising a first key and a second key;
   creating a certain number of one or more encryption keys using the received seed key pair, the certain number of encryption keys corresponding to a lifetime of the seed key pair; and
   decrypting encrypted broadcast service data broadcasted for the lifetime, using the encryption keys,
   wherein the creating of the certain number of encryption keys comprises:
      creating a certain number of one or more forward encryption keys by applying a forward hash chain to the first key;
      creating a certain number of one or more reverse encryption keys by applying a reverse hash chain to the second key; and
      creating a certain number of one or more traffic encryption keys using the forward encryption keys and the reverse encryption keys.

6. The method of claim 5, wherein the creating of the certain number of traffic encryption keys comprises performing an Exclusive OR operation on the forward encryption keys and the reverse encryption keys.

7. The method of claim 5, further comprising receiving a next seed key pair, when the terminal is a registered terminal and the lifetime has expired.

8. The method of claim 5, further comprising when the terminal is a Pay-Per-View (PPV) terminal and the lifetime has expired, transmitting a request for an additional broadcast service and receiving a next seed key pair in response thereto if the terminal requires the additional broadcast service.

9. An apparatus for providing a broadcast service in a communication system, the apparatus comprising:
   a transceiver;
   a seed key creator for creating a seed key pair comprising a first key and a second key, and for transmitting the seed key pair to a terminal to which the broadcast service is to be provided, through the transceiver;
   an encryption key creator for creating a certain number of one or more encryption keys using the seed key pair, the certain number of encryption keys corresponding to a lifetime of the seed key pair; and
   a data encryptor for encrypting broadcast service data for the lifetime using the encryption keys, and for broadcasting the encrypted broadcast service data through the transceiver, and
   wherein the encryption key creator creates a certain number of one or more forward encryption keys by applying a forward hash chain to the first key, creates a certain number of one or more reverse encryption keys by applying a reverse hash chain to the second key, and creates a certain number of one or more traffic encryption keys using the forward encryption keys and the reverse encryption keys.

10. The apparatus of claim 9, wherein the encryption key creator creates the traffic encryption keys by performing an Exclusive OR on the forward encryption keys and the reverse encryption keys.

11. The apparatus of claim 9, further comprising a controller for controlling the seed key creator to create and transmit a next seed key pair to the terminal, when the terminal is a registered terminal and the lifetime has expired.

12. The apparatus of claim 9, further comprising a controller for controlling the seed key creator to create and transmit a next seed key pair to the terminal upon receipt of a request for an additional broadcast service from the terminal through the transceiver, when the terminal is a Pay-Per-View (PPV) terminal and the lifetime has expired.

13. An apparatus for receiving a broadcast service in a terminal for a communication system, the apparatus comprising:
   a transceiver for receiving a seed key pair comprising a first key and a second key;
   an encryption key creator for creating a certain number of one or more encryption keys using the received seed key pair, the certain number of encryption keys corresponding to a lifetime of the seed key pair; and
   a data decryptor for decrypting encrypted broadcast service data broadcasted for the lifetime, using the encryption keys, and
   wherein the encryption key creator creates a certain number of one or more forward encryption keys by applying a forward hash chain to the first key, creates a certain number of one or more reverse encryption keys by applying a reverse hash chain to the second key, and creates a certain number of one or more traffic encryption keys using the forward encryption keys and the reverse encryption keys.

14. The apparatus of claim 13, wherein the encryption key creator creates the traffic encryption keys by performing an Exclusive OR on the forward encryption keys and the reverse encryption keys.

15. The apparatus of claim 13, further comprising a controller for receiving a next seed key pair through the transceiver, when the terminal is a registered terminal and the lifetime has expired.

16. The apparatus of claim 13, further comprising a controller for, when the terminal is a Pay-Per-View (PPV) terminal and the lifetime has expired, transmitting a request for an additional broadcast service through the transceiver and receiving a next seed key pair through the transceiver in response to the request if the terminal requires the additional broadcast service.

17. An apparatus for providing a broadcast service in an Open Mobile Alliance BroadCAST (OMA BCAST) system, the apparatus comprising:

a Service Protection-Key Distribution unit (SP-KD) for creating a seed key pair comprising a first key and a second key, and for transmitting the seed key pair to a terminal to which the broadcast service is to be provided; and a Service Provider-Encryption unit (SP-E) for receiving the seed key pair from the SP-KD, for creating a certain number of one or more encryption keys, the certain number of which corresponds to a lifetime of the received seed key pair, for encrypting broadcast service data for the lifetime using the encryption keys, and for transmitting the encrypted broadcast service data to the terminal, and wherein the SP-E creates a certain number of one or more forward encryption keys by applying a forward hash chain to the first key, creates a certain number of one or more reverse encryption keys by applying a reverse hash chain to the second key, and creates a certain number of one or more traffic encryption keys using the forward encryption keys and the reverse encryption keys.

18. The apparatus of claim 17, wherein the SP-E creates the traffic encryption keys by performing an Exclusive OR on the forward encryption keys and the reverse encryption keys.

19. The apparatus of claim 17, wherein the SP-KD creates and transmits a next seed key pair to the terminal, when the terminal is a registered terminal and the lifetime has expired.

20. The apparatus of claim 17, wherein the SP-KD creates and transmits a next seed key pair to the terminal upon receipt of a request for an additional broadcast service from the terminal, when the terminal is a Pay-Per-View (PPV) terminal and the lifetime has expired.

* * * * *